United States Patent

[11] 3,629,918

| [72] | Inventor | Lowell T. Hart<br>Newcomerstown, Ohio |
|---|---|---|
| [21] | Appl. No. | 859,802 |
| [22] | Filed | Sept. 22, 1969 |
| [45] | Patented | Dec. 28, 1971 |
| [73] | Assignee | Heller Tool Division, Wallace-Murray Corporation<br>Newcomerstown, Ohio |

[54] FILE
15 Claims, 9 Drawing Figs.

| [52] | U.S. Cl. | 29/78 |
|---|---|---|
| [51] | Int. Cl. | B23d 71/00 |
| [50] | Field of Search | 29/78, 79 |

[56] References Cited
UNITED STATES PATENTS

| 34,866 | 4/1862 | Whipple | 29/78 |
|---|---|---|---|
| 43,775 | 8/1864 | Jacobs | 29/78 X |
| 58,025 | 9/1866 | Nicholson | 29/78 |
| 189,733 | 4/1877 | Heffernan | 29/78 |
| 507,071 | 10/1893 | Huff | 29/78 |
| 570,579 | 11/1896 | Weed | 29/78 |
| 672,780 | 4/1901 | Kellerman | 29/78 |
| 2,663,071 | 12/1953 | Ritter | 29/78 |
| 3,217,382 | 11/1965 | Dobbelaere | 29/78 |

FOREIGN PATENTS

| 15,013 | 12/1900 | Sweden | 29/78 |
|---|---|---|---|

*Primary Examiner*—Harrison L. Hinson
*Attorney*—Fay, Sharpe and Mulholland

ABSTRACT: A file having a convex surface with a multiplicity of spaced depressions therein. At least some of the depressions are spaced from all the others and include an adjacent upset cutting lip. The surface of each of at least some of the depressions defines an arc in one plane; the arc being coextensive with the gullet of that depression; and the length of the chord from one end of the gullet to the other being greater than the width of the depression in an orthogonal plane.

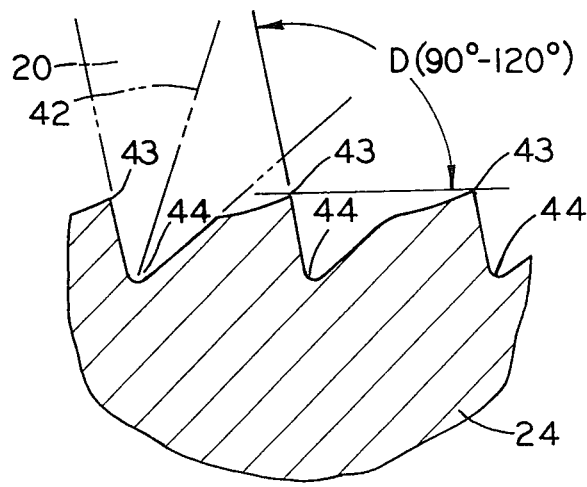
FIG. 1 (25X)
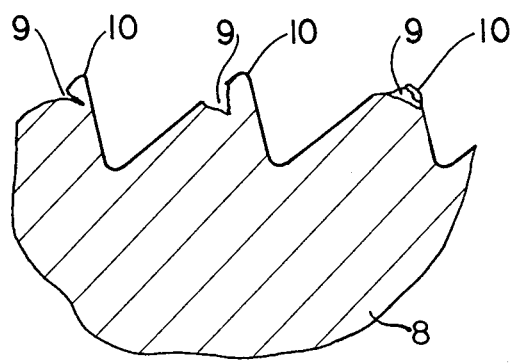
FIG. 2 (PRIOR ART 25X)
INVENTOR
LOWELL T. HART
BY
Fay, Sharpe & Mulholland
ATTORNEYS

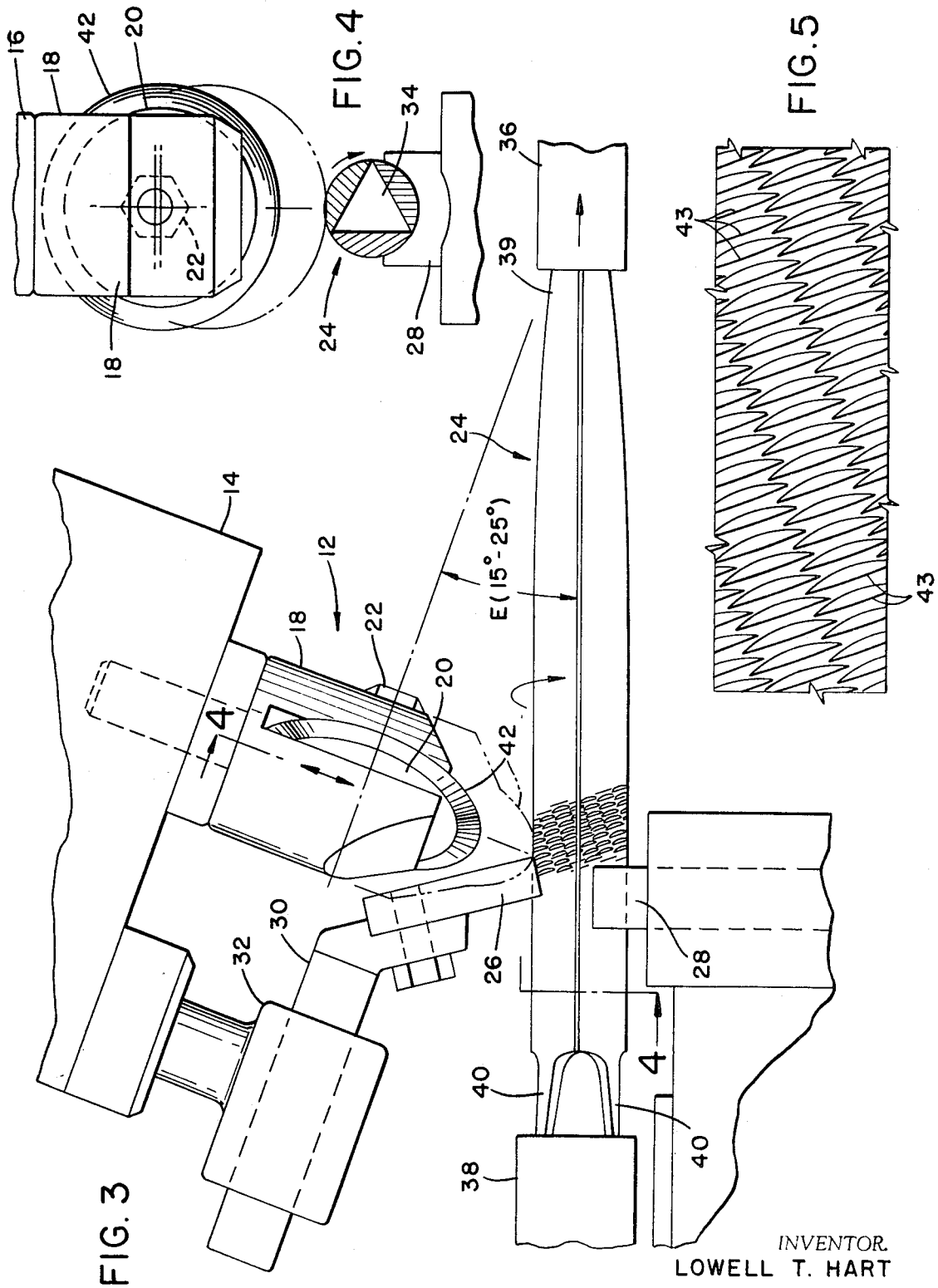

INVENTOR.
LOWELL T. HART

BY

*Fay, Sharpe & Mulholland*
ATTORNEYS

FILE

BACKGROUND OF THE INVENTION

Files are conventionally made by forming teeth in a relatively soft metal blank and then hardening the blank. The teeth are formed by rolling, milling or chisel impact.

The invention is particularly concerned with round files and the so called "half-round" files. The conventional half-round file, in fact, defines a convex surface subtended by an angle of 120°, in other words, a "half-round" is in fact only ⅓ of the circumference of a circle.

Conventionally, round and half-round files are made by substantially the same process. Three "half-round" file blanks are mounted on an arbor with the convex surface facing outward. In this manner, they define a round surface similar to the surface of the round file blank. Where a chisel is used to form the file teeth, it has a straight cutting edge which is V-shaped in cross section and is inclined at an angle with respect to the axis of the round file or arbor. As the blank is slowly rotated and longitudinally advanced, the chisel reciprocates back and forth and by repeated impacts cuts a series of helical grooves in the advancing file blank. As is obvious, the straight edge of the chisel will cut deeper at the center than at the edges. Also, because the cutting surface of the chisel is straight, each succeeding cut along the helix will be slightly misaligned which results in a splitting of the upset, crest portion of the tooth which is to be the cutting portion of the file. The splitting of the tooth is obviously an imperfection which weakens it and inherently reduces the useful life of the file. This tooth splitting problem could be overcome by providing a concave cutting edge on the chisel, designed specifically to conform to the curved configuration of the file blank. Unfortunately, this is not a practical solution because conventional half-round files are partially cylindrical for approximately ⅔ of the body length and are tapered the remaining ⅓ distance. Thus, a single curved chisel could not accommodate the total tapered surface.

An alternate method would be to have a straight chisel of very short width. In theory, if the width of the chisel is reduced enough, a perfect helix would be formed. Unfortunately, files must be manufactured on a competitive basis and the theory requires too many cuts of the chisel to be economically practical in the market place. Thus, the industry has balanced its operations between the needed short width of the chisel and the economic need for a great width of the chisel with the result that teeth are split by the chisel to a greater or lesser extent, depending upon the manufacturing objectives.

It is conventional to have a "double cut file" for the purpose of breaking up filing chips resulting in reduced clogging and faster stock removal. The conventional method of making the double cut is to make a series of relatively light helical cuts called an "overcut" on the first pass and subsequently cut another oppositely rotating series of helixes about the file blank which are slightly deeper than the initial overcut.

The second series of deeper cuts is called the "upcut" and intersects the first cut known as the "overcut" at an angle to form diamond or rectangular shaped teeth. The conventional double cut round and half-round file is made by two separate and distinct chisel cutting operations or by combination of a rolled knurled "overcut" and a chisel cut "upcut."

This knurled "overcut" is accomplished by installing a round knurled blank under the rotating arbor during the cutting operation. Pressure is applied from the chisel cutting side of the arbor, or opposite the knurl, by the use of a hold down plate known as the "foot piece." The pressure applied from the foot piece to the arbor forces the file blanks on the arbor against the round knurl which then rotates with the rotation of the arbor, resulting in a knurled "overcut" serration around the periphery of the file blank.

The resulting "double cut file" consists of a series of diamond shaped rectangularly shaped teeth projecting from the convex surface of the file. Many of the teeth formed will have been weakened by the aforementioned teeth splitting.

Experiments have been conducted to ascertain the useful life of various files by testing in a machine designed to operate the file at a predetermined pressure or load, length of filing stroke and stroke speed to simulate good hand filing practices. The machine is designed to put a uniform pressure on the file as it engages and moves across the surface of the part to be filed. As teeth are broken out of the file, the result of teeth splitting, and as the sharp teeth edges begin to be worn down, the number of strokes and/or pressure required to cut through a given depth of material becomes greater. As an example, a bastard half-round standard file; tested in such a machine for approximately 2,000 becomes so damaged by dullness or tooth fracturing as to render it useless at the predetermined file load or pressure of the testing machine.

A problem also exists in that different files are adapted for filing some materials but not others. There are files for use on brass, others for plastics, etc. Thus, there is a need in the industry to provide files having a universal application which does not require a changing or files for use with different materials.

A file used on magnesium should be equally useful when filing brass.

A further need is for a file which will have a longer useful life made possible by eliminating the tooth splitting aspect of the straight chisel cut and a file which may achieve the metal removal capabilities of a double cut file but which requires only a single cut on its convex surface.

BRIEF DESCRIPTION OF THE INVENTION

This invention has overcome the difficulties and filled the needs in the art by providing a convex, curved chisel cutting edge to impact against the file blank. The resulting file includes a plurality of distinct, separated depressions formed in the convex surface of the file blank with the gullet of the depression defining an arc disposed at an angle with respect to the axis of the file. Each depression is formed with the gullet at the same angle with respect to the axis of the file as all the other gullets. However, each of the depressions is offset longitudinally along the file from the adjacent depressions near its end. In this manner, a helical grove is not cut around the surface of the file blank. Rather, the chisel is programmed to strike the file blank in such a pattern that the gullets of the depressions are offset or staggered out of alignment. The result is a series of arcuate depression aligned in helical rows whereby a line drawn between the deepest part of the gullet of each depression in each row defines a helix about the file blank. The edges of the depressions in each row intermesh with the edges of the depressions in the adjacent rows but since they are offset, the edge of no depression merges with any other depression.

The result of this particular novel means of forming a file is a single cut file appearing and having the operational affect of a double cut file. When the curved chisel cutting edge impinges at an angle against the file blank, it upsets the metal adjacent one side of the depression. The upset defines a sharp cutting lip having its highest relief adjacent the deepest part of the depression and tapering to approximately zero relief at the edges of the curved gullet. The effect is that of a series of helical cuts extending transverse to the direction of the gullet of the depressions and adjacent teach edge of helical row of depressions.

This particular pattern of file tooth gives the user a very smooth surface finish with a relatively coarse tooth, extends the life of the file and allows easy cleaning. Testing of this novel file on the aforementioned machine reveals an increased useful life of 20 to 600 percent.

It is an object of this invention to provide a novel file.

Further objects of the invention will be obvious from a reading of the detailed description.

BRIEF DESCRIPTION OF THE DRAWING

FIG. 1 is a fragmentary sectional view of a file made in accordance with this invention showing the teeth extending vertically upward.

FIG. 2 is a fragmentary sectional view of a file made by the conventional method employed in the prior art with the teeth of the file extending vertically upward.

FIG. 3 is a fragmentary side elevational view of a file cutting machine showing the relative orientation of the circular chisel and the file blanks as the teeth are being cut;

FIG. 4 is a sectional view taken along line 5—5 of FIG. 3;

FIG. 5 is a plan view of the convex surface of a file after the teeth are cut by the novel method of this invention;

PREFERRED EMBODIMENT

Figure 6:
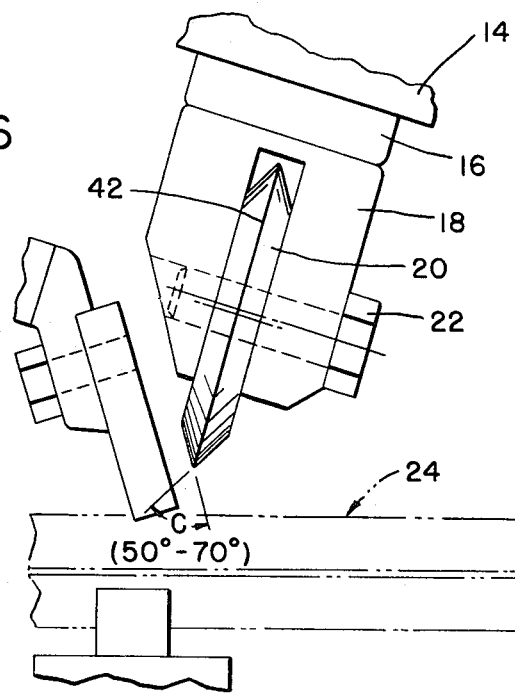
FIG. 6 is an elevational view of the chisel used to cut the teeth of the file blank.

FIG. 2 illustrates the defects which result in the prior art and why the teeth of a double cut file 8 tends to break out during use. The tooth splitting 9 at the crest 10 which results from the impact of a straight chisel has weakened the teeth and the "break out" will occur at the weakest point below the crest.

The machine 12 illustrates in FIG. 3 for cutting the file teeth of this invention is, except for the position of the sequential impacts of the chisel edge, conventional in most aspects of its operation. It includes a cutting head 14 with a hammer 16 built into the head. A chisel holder 18, bifurcated at its lower end, is held in a chuck in the bottom of the hammer and a circular chisel 02 is held in place between the bifurcations by a bolt 22. The hammer reciprocates the chisel back and forth toward the file blanks 24 in a programmed pattern as will be explained subsequently.

A conventional foot piece 26 holds the file blanks 24 against an anvil 28 in the well-known manner used in many file cutting machines. The foot piece 26 is supported by a bar 30 held rigidly in place by a chuck 32 attached to the cutting head.

While FIG. 3 shows three half-round file blanks mounted on an arbor 34, it is emphasized that a round file is cut in substantially the same manner without the arbor. The half-round files are secured rigidly against the arbor by a front clamp 36 and a tang clamp 38.

Conventionally files are made from a file blank having a tip 39 at one end and a tang 40 at the other end. The teeth are usually cut sequentially from near the tip toward the tang as the file blanks are simultaneously rotated and move longitudinally as the chisel reciprocates back and forth making cuts in a predetermined pattern in the file blank. The files of this invention are no exception and it is preferred that the tooth cutting operation begin at the forward tip 39 and progress toward the tang 40.

The particular program for correlating the rotation and longitudinal movement of the file blank with respect to the reciprocation of the chisel 20 is unique but the means for setting up such a program is well known in the art and no particular description on this matter appears necessary.

The chisel 20 has a circular cut edge 42 and it is preferred in some cases that the chisel be substantially symmetrical about a plane coextensive with the circular cutting edge. A symmetrical chisel allows a minimum of instructions on sharpening and precludes improper assembly by an inexperienced operator. However, in some instances the faces of the chisel may be ground at different angles to cut file teeth for specialized usage.

The orientation of the chisel with respect to the file blank is critical. As can be seen in FIG. 3, the chisel is both tilted and rotated with respect to the axis of the file bank 24. FIG. 3 is a view taken at right angles to the axis of the file blank.

Figure 7:
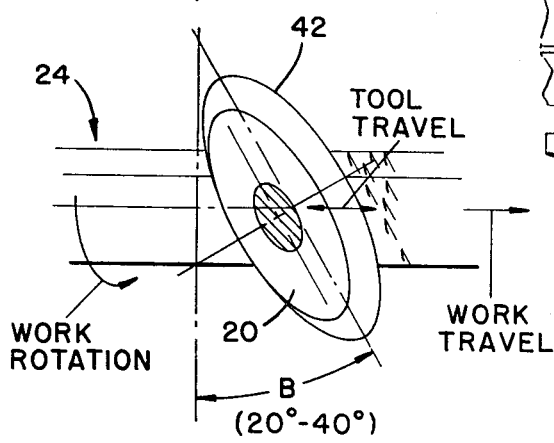
FIG. 7 is a fragmentary plan view of the chisel shown as oriented with respect to the file blank during the tooth cutting operation.
Figure 8:
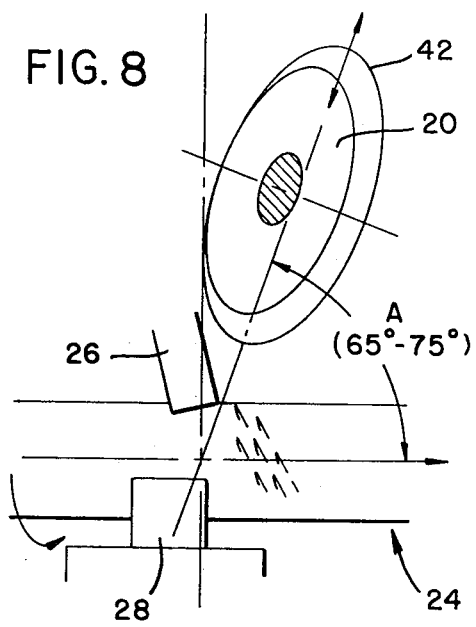
FIG. 8 is a fragmentary elevational view of the chisel and file blank of FIG. 7.
Figure 9:
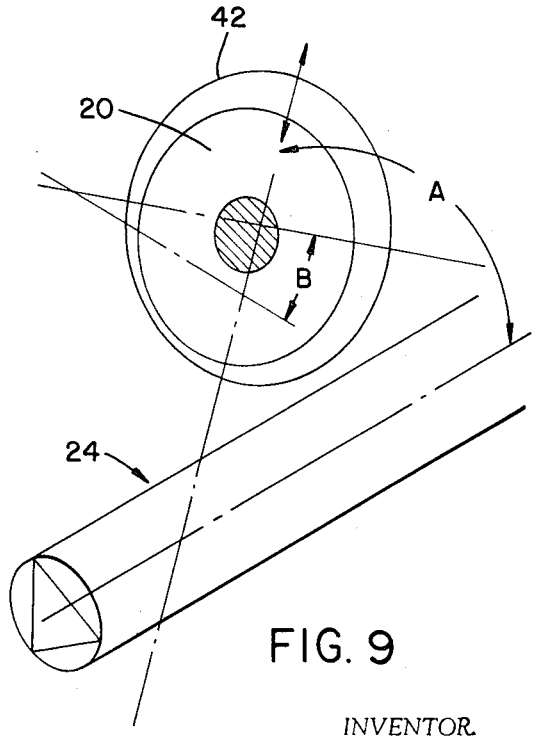
FIG. 9 is a diagrammatic perspective view of the orientation of the file blanks and the chisel during the tooth cutting operation.

The relative orientation between the chisel and file blank is best illustrated in FIGS. 7–9. For a proper description it is desirable to define the relative angles with respect to the axis of the file blanks and for purposes for the following, the axis of the file blank is considered to be horizontal.

During the cutting operation, the top of the chisel 20 is tiled forward toward the file tip 39 to form vertical angle A in the range 65° to 75° with the horizontal file axis, and it is preferred that the angle be approximately 70°. At the same time, the chisel holder 18 is rotated an angle B in the range 20° to 40° as measured in a horizontal plane. It is preferred that the angle be approximately 30° for best operation of the file for general purposes.

The angle C subtended by the chisel faces define an angle in the range 50° to 75° and the faces may be ground at the same or different angles, as desired.

The depression formed by one impact of the chisel on the file blank is somewhat V-shaped in configuration when viewed in cross section, see FIG. 3, and in a plan view appears substantially as a segment of a circle, as best seen in FIG. 6. While the edge of the depression which forms the crest of the tooth 3 appears substantially as a straight line, it is in fact slightly curved with the concave portion facing the opposite side of the depression.

It is important to note that in the method and resulting file structure, the chisel 20 is tilted toward the front tip of the file and as a result of the chisel impact, the tooth 43 is formed by the upset of the metal on the side of the depression which is nearest the tang 40.

The resulting V-shaped depression includes a gullet 4 at the bottom of the V. Gullet 44 defines an arc lying in a plane at a horizontal angle of from 50° to 70° with respect to the axis of the file and the chord which extends from one end of the gullet to the other is greater than the width of the depression measured in a plane orthogonal to the plane defined by the gullet 44. That is, the depression is longer than it is wide.

This statement may appear inherent on viewing the chisel and file blank as represented in the drawings. However, it is important to emphasize this point because there is a critical relationship between the radius of the file blank and the radius of the chisel. It is intended that the radius of the chisel not be substantially greater than twice the radius of the convex surface of the file blank. It has been found by experiment that where this relationship is adherred to, the resulting file has a greater life and the resulting 2]eth tend to be somewhat self cleaning in that the chips severed from stock tend to separate from the file automatically.

As a result of the attitude of the chisel with respect to the file blank, the V-shaped depression subtends an angle substantially identical to that of the chisel faces which is in the range 50° to 70°, and the most vertical leg of the V-shaped depression forms an angle D with the surface of the file in the range 90° to 120°, see FIG. 1. It is preferred that this angle be approximately 100°.

The arcuate depressions have an axis which extends at an angle E with respect to the axis of the file blank and when viewed in FIG. 3, this angle is approximately 15° to 25°in a vertical plane.

It should be noted that lines joining the deepest part of the gullets of the rows of depressions in the file blank are substantially parallel that is, each defines a part of helix which is interchangeable with the other helixes formed by the other rows of depressions.

In conventional double cut files, the cutting teeth which form the raised checkerboard pattern serve as chip breakers. In this invention a similar but more effective chip breaking effect is accomplished by disposing all of the depressions at the same angle with respect to the axis of the file blank and aligning them in helical rows. The double cut effect is accomplished by providing that the depression in the aligned rows are all axially spaced from each other along the blank.

Depressions in adjacent rows do overlap or intermesh at their edges, but because the depressions are staggered longitudinally, one depression does not merge at any point on the parallel section of the file. There may be slight merging on the tapered tip but it is intended that such be kept to a minimum.

As will be observed in FIG. 6, the result of the one pass by the chisel or a "single cut" provides a visual effect similar to a double cut file and in operation the file of this invention cuts more deeply, last longer, and cleans more easily than a conventional double cut file. What is accomplished is a single cut operation with a resulting file superior to a standard double cut file. The economic implications are obvious.

Conventionally file blanks, whether they be round or half-round, have a cylindrical surface for about two thirds of the length of the file which merges with a frustoconical surface which tapers toward the tip 39 and away from the tang 40. As can be seen in FIG. 3, this fact is true of the file blanks of this invention in that it is intended that conventional file blanks may be used. Part of the novelty of this invention lies in the multiplicity of spaced depressions, each separated from the other and the particular way the resulting cutting teeth 43 are formed rather than any novelty in the file blank before the teeth are cut. After the teeth are formed in the frustoconical and cylindrical surfaces, the resulting files are more universally useful with different materials than the conventional double cut files but the invention herein defined is concerned with the method of forming the depressions and with the resulting file after the depressions are formed rather than the shape of the file blank before the teeth are formed.

As with any half-round file, the half-round file of this invention has a flat surface opposite the convex surface and cutting teeth are formed thereon of a shape similar to those on the convex surface or in the alternative, a conventional double cut or single cut set of file teeth could be formed on the flat surface, as desired.

I claim:
1. A file having a convex surface,
 a multiplicity of spaced depressions in said surface,
 at least some depressions being spaced from all the others,
 an upset cutting tooth adjacent at least some depressions,
 the surface of each of at least some of said depressions defines an arc in one plane, each said arch being coextensive with the gullet of that depression and the length of the chord from one end of the gullet to the other being greater than the width of the depressions in an orthogonal plane,
 each said arc being concave with respect to the convex surface of said file,
 at least some of said depressions being aligned in rows wherein a line joining the deepest parts of gullets of each row of depressions substantially defines a part of a helix,
 the radius of each arc being greater than the radius of said convex surface but not being substantially greater than twice the radius of said convex surface.

2. The file of claim 1 wherein lines through the deepest parts of gullets in adjacent rows are substantially parallel.

3. The file of claim 1 having a tang on one end, at least some of said cutting teeth being disposed at the side of the depression which is nearest the tang.

4. The file of claim 1 wherein said convex surface defines at least part of a curved surface about the file axis, each of at least some of said arcs having different axes which extend at an angle with respect to said first axis.

5. The file of claim 4 wherein said angles are substantially uniform.

6. The file of claim 5 wherein said angles are substantially in the range 15°–25° measured in a vertical plane between the lines defining the axes of the arcs and a horizontal plane coextensive with the file axis.

7. The file of claim 1 wherein said convex surface defines at least part of a curved surface having a horizontal first axis and wherein the chord of an arc on the upper surface of the file extends at an angle to said axis in the range 50°–70°.

8. The file of claim 1 wherein at least some of the depressions are substantially V-shaped in a cross section along said orthogonal plane.

9. The file of claim 8 wherein said V-shaped depressions define an angle in the range 50°–70°.

10. The file of claim 8 wherein at least on leg of each of said V-shaped depressions defines an angle with said convex surface in the range 90°–120°.

11. The file of claim 10 having a tang on one end, said leg being the one nearest said tang.

12. The file of claim 1 wherein at least part of said convex surface substantially defines a frustum of a cone.

13. The file of claim 1 wherein at least part of the convex surface is substantially cylindrical.

14. The file of claim 13 wherein at least part of said convex surface substantially defines a frustum of a cone.

15. The file of claim 1 wherein the convex surface which includes said depressions defines a cutting surface and said file includes another cutting surface which is substantially planar.

* * * * *